Patented June 30, 1936

2,045,660

UNITED STATES PATENT OFFICE 2,045,660

PROCESS OF POLYMERIZATION

Donald John Loder, Wilmington, Del., assignor to Dupont Viscoloid Company, Wilmington, Del., a corporation of Delaware No Drawing. Application June 1, 1934, Serial No. 728,550

7 Claims. (Cl. 260—2)

This invention relates to a process of polymerization and, more particularly, to an improved process of polymerizing liquid methyl methacrylate monomer to a bubble free solid free of internal visual defects.

Alpha-methyl methacrylate monomer (hereinafter referred to simply as methyl methacrylate monomer) is a liquid having a boiling point of 100–101° C., which may be readily polymerized to a solid. Its preparation is disclosed in Rowland Hill U. S. application Serial No. 641,113, filed November 3, 1932. This liquid may be polymerized in block or other solid shape free from flaws, if a relatively long period of time is allowed for the resin to setup or polymerize, for example, 14–30 days. Such a time consuming procedure increases inordinately the cost of the finished product due to the tie-up of apparatus and of material in process.

By employing polymerization catalysts, high temperatures, actinic light, and/or other means, it is known that polymerization may be greatly speeded up. However, where the polymerization has been materially accelerated by heretofore known methods, especially in polymerizing material in solid shapes, the resulting product has always contained internal bubbles, flaws, and other visual defects which renders it more or less unfit for fabrication into articles which are valuable because of their appearance. Moreover, the larger the size of the solid shape the greater the tendency to form bubbles and also the greater the tendency for incomplete polymerization of the whole for, although the outer surface of the mass may be completely polymerized, the center is often only partially polymerized and, in some instances, substantially not at all.

An object of the present invention is to provide a simple and economical process of polymerizing a mass comprising liquid methyl methacrylate monomer with or without auxiliary ingredients such as plasticizers, accelerators, and the like, to give a bubble free product having no visual defects. A further object is to provide such a process which requires only a fraction of the time for polymerization heretofore required in obtaining a bubble free mass of polymerized methyl methacrylate. A further object is to avoid the objections of the prior art processes hereinabove discussed. Other objects of the invention will be apparent from the description given hereinafter.

The above objects are accomplished according to the present process by heating a continuous mass comprising liquid methyl methacrylate monomer, with or without polymerization catalysts, plasticizers, or other auxiliary ingredients, to initiate polymerization of the monomer and thereafter removing the exothermic heat of reaction from the mass at a rate at least sufficient to hold the temperature throughout the mass below the temperature of bubble formation.

It has been observed that, in polymerizing methyl methacrylate monomer, the exothermic heat of reaction once polymerization has been initiated, quickly raises the temperature of the material being polymerized. If the material is in a solid shape, particularly where a fair mass of material is involved, this has the result of overheating in local spots, if not throughout the mass, so that gases are formed, i. e., the temperature has reached the boiling point of methyl methacrylate monomer, or the lowest boiling constituent in the mass and, consequently, bubbles must pass up and out through the mass. After polymerization has progressed to a point where the liquid has a high viscosity and is approaching a solid, these bubbles can no longer escape but remain locked in the mass and constitute a prominent visual flaw in the material. By the present invention this exothermic heat is removed at a rate at least sufficient to prevent the temperature in any portion of the mass reaching a point where bubble formation might occur, thus providing for the production of a solid free of visual flaws while, by careful control of the rate of removal of the exothermic heat, permitting polymerization to be carried out at an elevated temperature and in a relatively short time.

In carrying out the invention the liquid methyl methacrylate monomer, with or without auxiliary ingredients, is placed in a mold or other container and then, to initiate polymerization of the monomer, heat is applied. To avoid bubble formation, the temperature of the mass must not be raised as high as 100° C., the boiling point of the monomer; it is preferred to raise the temperature of the mass to 70–95° C., a temperature of about 80° C. being the optimum in most instances. The polymerization once initiated, is an exothermic reaction and the heat generated in the mass is removed at a rate at least sufficient to prevent any part of the mass reaching the temperature of bubble formation, which is about 100° C., or possibly lower, depending upon the particular composition of the mass. In preferred form the rate of removal of the exothermic heat is carefully regulated so that, although the temperature of the mass in no portion is allowed to reach the temperature of bubble formation, the mass is nevertheless kept at an elevated temperature so that polymerization proceeds at a relatively rapid rate. The removal of the exothermic heat is continued until the mass is polymerized to the point desired. In this way a crystal clear solid mass may be produced, free of visual defects, in a fraction of the time heretofore required to produce such a product.

The exothermic heat may be withdrawn by subjecting the mass being polymerized to the influence of a fluid medium properly regulated to remove the exothermic heat as desired. Various specific methods of doing this will occur to those skilled in the art. This may be done by flowing gases or vapors around the mass as, for example, a flow of warm air. More conveniently, and a preferred method of doing this, is to place the container or mold containing the liquid methyl methacrylate monomer in a liquid bath and so regulating the temperature and/or flow of the liquid around the container that the mass being polymerized is kept at the desired temperature. Water, alcohol, or similar liquid, having a high heat capacity is preferably used and a sufficient turbulence or flow is desirably maintained so that the removal of heat will be effective and controlled. It is in some instances desirable to employ for the removal of the exothermic heat a liquid boiling at the temperature at which it is desired to effect polymerization or somewhat below that temperature in order to effect a sufficiently rapid rate of heat removal to maintain the reaction mass at the desired temperature.

In order to illustrate the invention, the following specific examples are given:—

*Example 1.*—A mixture consisting of 600 grams of monomeric methyl methacrylate and 400 grams of dimethyl phthalate is poured into a glass container which is capped. The resulting mixture is placed in a water bath held at a temperature in the neighborhood of 95° C. The polymerization reaction proceeds smoothly with a very small loss of methyl methacrylate by evaporation and after a period of approximately 8 hours complete and thorough polymerization of the mass is obtained. The resulting product is entirely free from bubbles, is as transparent as mineral glass, and is substantially fully polymerized.

*Example 2.*—The procedure employed in Example 1 is duplicated with a mixture consisting of 600 grams of monomeric methyl methacrylate and 600 grams of neutral phthalic acid ester of ethylene glycol. A water-clear, substantially completely polymerized resin is obtained.

*Example 3.*—A mixture consisting of 600 grams of monomeric methyl methacrylate and 400 grams of diamyl phthalate is sealed in a glass container. The container is then placed in an oven maintained at a temperature of 85° C. and a rapid current of hot air is passed over and around the container to insure that the temperature of the mixture is not appreciably above 85° C. After about 48 hours a clear, transparent, fully polymerized resin is obtained.

It is desirable, when using fluids such as gases having a low specific heat, that the fluid be circulated with sufficient rapidity to thoroughly remove the heat from the polymerizing composition in order that the temperature within the mass be prevented from rising above the temperature of bubble formation. This is particularly true when the composition has become so viscous that bubbles could no longer rise through it and escape.

*Example 4.*—To monomeric methyl methacrylate is added approximately 1% by weight of benzoyl peroxide. The resulting mixture is placed in a closed container and immersed in a water bath maintained at a temperature of approximately 80° C. for 4 hours. A bubble free, substantially completely polymerized resin is obtained.

*Example 5.*—The procedure of Example 4 is duplicated with a mixture comprising by weight 84% monomeric methyl methacrylate, 1% benzoyl peroxide, and 15% dibutyl phthalate. A bubble free, completely polymerized resin is obtained.

It is to be understood that the above examples are merely illustrative and that the process of the present invention broadly comprises heating monomeric methyl methacrylate, with or without auxiliary ingredients, to initiate polymerization and thereafter removing by any means the exothermic heat from the mass at a rate at least sufficient to hold the temperature throughout the mass below the temperature of bubble formation, while in a preferred embodiment of the invention, the removal of exothermic heat is carefully controlled so that the mass is held at an elevated temperature, for example, between 70 and 95° C., in order to expedite the polymerization.

Not only polymerization catalysts and plasticizers may be included but also coloring matter and various special effect materials. Since a particular object of the present invention is to produce bubble free polymerized methyl methacrylate having no visual defects, the inclusion of insoluble coloring matter or fillers would not be usual, although they are by no means excluded. Instead of employing only monomeric methyl methacrylate as the resin to be polymerized, the process may also be carried out with mixtures wherein the methyl methacrylate is substituted in part by homologous resins. In this manner inter-polymers and mixtures of polymers may be obtained.

Any suitable type of container may be employed for holding the composition to be polymerized in accordance with the invention. If glass vessels are used, it is generally necessary that the glass be broken away from the resin in order that the configuration of the vessel be retained. Commercially, a split mold may be used or, if rods, cylinders, and the like, are to be fabricated, a tapered mold may be employed with advantage, the polymer being tapped out of the mold from the small end. Other suitable molds or containers may be employed.

The present invention provides a simple and economical process of preparing glass-clear resin products free of visual flaws. Objects of any section, contour, and thickness, whether solid or hollow, may be made, as for example, in the manufacture of sheets, slabs, blocks, rods, tubes, rings, electric insulating parts, or any other articles such as are commonly produced from phenolic resins, cellulose derivatives, and like materials. Resinous bodies may be prepared to be fabricated into articles by machining or otherwise cutting from rods, blocks, and the like, for the preparation of a wide assortment of objects such as beads, bracelets, and the like. The compositions may be made transparent, opaque, plain, or colored and with any desired pattern or mottle, as for instance, imitation pearl, tortoise shell, and the like.

A particular advantage of the present invention lies in the fact that it provides a method of obtaining bubble free products having no visual flaws in but a fraction of the time heretofore necessary for the preparation of such products.

As many apparently widely different embodiments of this invention may be made without departing from the spirit and scope thereof, it is to be understood that the invention is not limited to the specific embodiments thereof except as defined in the appended claims.

I claim:

1. Process of preparing a bubble free, solid, massive product comprising heating a continuous mass comprising liquid methyl methacrylate monomer to initiate polymerization of the monomer and thereafter removing the exothermic heat of reaction from the mass at a rate at least sufficient to hold the temperature throughout the mass below the temperature of bubble formation until a solid polymerized mass is obtained.

2. Process of preparing a bubble free, solid, massive product comprising heating a continuous mass comprising liquid methyl methacrylate monomer and a plasticizer for polymerized methyl methacrylate, to initiate polymerization of the monomer, and thereafter removing the exothermic heat of reaction from the mass at a rate at least sufficient to hold the temperature throughout the mass below the temperature of bubble formation until a solid polymerized mass is obtained.

3. Process of preparing a bubble free, solid, massive product comprising heating a continuous mass comprising liquid methyl methacrylate monomer and a polymerizing catalyst therefor, to initiate polymerization of the monomer, and thereafter removing the exothermic heat of reaction from the mass at a rate at least sufficient to hold the temperature throughout the mass below the temperature of bubble formation until a solid polymerized mass is obtained.

4. Process of preparing a bubble free, solid, massive product comprising heating a continuous mass comprising liquid methyl methacrylate monomer to a temperature between 70° C. and the temperature of bubble formation to initiate polymerization of the monomer, and thereafter removing the exothermic heat of reaction from the mass at a rate at least sufficient to hold the temperature throughout the mass below the temperature of bubble formation until a solid polymerized mass is obtained.

5. Process of preparing a bubble free, solid, massive product comprising heating in a fluid bath a continuous mass comprising liquid methyl methacrylate monomer to initiate polymerization of the monomer, and thereafter regulating the fluid bath to remove the exothermic heat of reaction from the mass at a rate at least sufficient to hold the temperature throughout the mass below the temperature of bubble formation until a solid polymerized mass is obtained.

6. Process of preparing a bubble free, solid, massive product comprising heating in a fluid bath a continuous mass comprising liquid methyl methacrylate monomer to a temperature between 70° C. and the temperature of bubble formation to initiate polymerization of the monomer, and thereafter regulating the fluid bath to remove the exothermic heat of reaction from the mass at a rate sufficient to keep the temperature throughout the mass between 70° C. and the temperature of bubble formation until a solid polymerized mass is obtained.

7. Process of preparing a bubble free, solid, massive product comprising heating in a liquid bath a continuous mass comprising liquid methyl methacrylate monomer to a temperature between 70° C. and the temperature of bubble formation to initiate polymerization of the monomer, and thereafter regulating the liquid bath to remove the exothermic heat of reaction from the mass at a rate sufficient to keep the temperature between 70° C. and the temperature of bubble formation until a solid polymerized mass is obtained.

DONALD JOHN LODER.